US012728506B2

(12) United States Patent
Vinnik

(10) Patent No.: US 12,728,506 B2
(45) Date of Patent: Sep. 8, 2026

(54) TOOL FOR REMOVING A SEAL RING FROM A SPARK PLUG

(71) Applicant: Robert Bosch GmbH, Stuttgart (DE)

(72) Inventor: Mihail Vinnik, Saratov (RU)

(73) Assignee: Robert Bosch GmbH, Stuttgart (DE)

(*) Notice: Subject to any disclaimer, the term of this patent is extended or adjusted under 35 U.S.C. 154(b) by 364 days.

(21) Appl. No.: 18/563,798

(22) PCT Filed: Mar. 28, 2022

(86) PCT No.: PCT/EP2022/058137

§ 371 (c)(1),
(2) Date: Nov. 22, 2023

(87) PCT Pub. No.: WO2022/248101

PCT Pub. Date: Dec. 1, 2022

(65) Prior Publication Data

US 2024/0238951 A1 Jul. 18, 2024

(30) Foreign Application Priority Data

May 28, 2021 (DE) ..................... 10 2021 205 445.5

(51) Int. Cl.
*B25B 27/00* (2006.01)
*B26F 1/40* (2006.01)
*H01T 21/02* (2006.01)

(52) U.S. Cl.
CPC .......... *B25B 27/0028* (2013.01); *H01T 21/02* (2013.01); *B25B 27/0035* (2013.01); *B26F 1/40* (2013.01)

(58) Field of Classification Search
CPC .......... B26F 1/3846; B26F 1/40; B26F 1/405; B26F 1/44; B25B 27/0028; B25B 27/0035; B25B 27/06; H01T 21/02
See application file for complete search history.

(56) References Cited

U.S. PATENT DOCUMENTS 3,401,445 A 9/1968 Fritch
4,211,446 A 7/1980 Shultz, Sr.
(Continued)

FOREIGN PATENT DOCUMENTS

DE 102009044925 A1 3/2011
DE 102015205774 B3 9/2016
(Continued)

OTHER PUBLICATIONS

International Search Report for PCT/EP2022/058137, Issued Jul. 27, 2022.

*Primary Examiner* — Christopher J. Besler
(74) *Attorney, Agent, or Firm* — Norton Rose Fulbright US LLP

(57) ABSTRACT

A tool for removing a metal seal ring from a spark plug. The tool includes a housing with a receiving area for the spark plug, the housing having an open longitudinal side on which the receiving area is exposed and configured for inserting the spark plug via the open longitudinal side into the receiving area; a support device which projects into the receiving area and against which the metal seal ring of the spark plug inserted into the receiving area rests in the axial direction; a cutting device which can be moved in the receiving area in the axial direction of the tool, wherein a gap for receiving the metal seal ring of the spark plug is formed between the cutting device and the support device; and an actuation device, which can be actuated by hand and is operatively connected to the cutting device.

11 Claims, 4 Drawing Sheets

(56) References Cited

U.S. PATENT DOCUMENTS

| | | | | |
|---|---|---|---|---|
| 4,502,197 | A | 3/1985 | Harder | |
| 2020/0036167 | A1 * | 1/2020 | Claus ...................... | E05F 11/10 |

FOREIGN PATENT DOCUMENTS

| | | | |
|---|---|---|---|
| DE | 102017205285 | A1 | 10/2018 |
| WO | 2017076650 | A1 | 5/2017 |

* cited by examiner

TOOL FOR REMOVING A SEAL RING FROM A SPARK PLUG

FIELD

The present invention relates to a tool for removing a ring, in particular a metal seal ring, from a spark plug, in particular a hook spark plug or a prechamber spark plug.

BACKGROUND INFORMATION

In internal combustion engines, for example, spark plugs are screwed into cylinder heads by means of an external thread into a threaded bore in the cylinder head. FIG. 1 shows, by way of example, a hook spark plug 10 with a center electrode 13 and a ground electrode 14. A housing 11 has an external thread 12 with which the spark plug is screwed into a threaded bore in the cylinder head or the like. The reference sign 15 denotes an electrical insulator. On the housing 11, a shoulder 11*a* is arranged between the external thread 12 and a tool attachment region 17. A metal seal ring 16 is provided on the shoulder 11*a* and, in the screwed-in state of the spark plug, prevents gases from passing from the combustion chamber via a gap between the spark plug and the cylinder head to the outside. When the spark plug is screwed into the cylinder head, this metal seal ring 16 is often plastically deformed, which leads to improved sealing between the spark plug and the cylinder head. For example, during maintenance work, the spark plugs are unscrewed from the cylinder head and, where appropriate, reused. Here, the metal seal ring 16 then has to be pulled off the spark plug and replaced, which is often very difficult due to the deformation. In particular, care must be taken that the thread 12 of the spark plug is not damaged during the removal of the metal seal ring 16. Then, if the metal seal ring has been removed, a new metal seal ring can be slid on and the spark plug can be screwed into the cylinder head again. The removal of the metal seal ring is thus relatively complicated and often also associated with damages to the spark plug, so that the latter cannot be reused. It would therefore be desirable to have a tool which facilitates the removal of the metal seal ring from the spark plug.

SUMMARY

A tool according to the present invention for removing a metal seal ring from a spark plug may have an advantage that the metal seal ring can be removed from the spark plug easily and quickly. In this case, the risk of damage to the spark plug by the process of removing the metal seal ring is not given, so that recyclability of the spark plug after a new metal seal ring has been installed is possible. According to an example embodiment of the present invention, this is achieved in that the tool has a housing with a receiving area for receiving the spark plug. The housing comprises an open longitudinal side on which the receiving area is exposed and configured for inserting the spark plug via the open longitudinal side into the receiving area. Furthermore, the tool comprises a support device which projects into the receiving area. The support device is arranged in such a way that an inserted spark plug with a metal seal ring is located in the receiving area in such a way that the metal seal ring rests at least partially against the support device in the axial direction of the tool. Furthermore, the tool comprises a cutting device which can be moved in the receiving area in the axial direction of the tool. A gap for receiving the metal seal ring of the spark plug is formed between the cutting device and the support device. The tool furthermore comprises an actuation device, which can be actuated by hand and is operatively connected to the cutting device, in order to carry out the axial movement of the cutting device in the receiving area. During the axial movement of the cutting device, the cutting device is moved axially into the gap between the cutting device and the support device, in which the metal seal ring is located, in order to axially cut the metal seal ring. This is possible since the metal seal ring is supported on the support device on the one hand and is divided from the other side by means of the cutting device. As a result, after taking the spark plug out of the tool, the metal seal ring can easily be removed from the spark plug or the individual parts of the metal seal ring just fall off.

Preferred developments of the present invention are disclosed herein.

According to an example embodiment of the present invention, the actuation device preferably has a lever which is operatively connected to the cutting connection. As a result, a necessary force for dividing the metal seal ring is significantly reduced, since the lever carries out a force increase corresponding to the lever principle when the tool is actuated.

Furthermore preferably, according to an example embodiment of the present invention, the cutting device comprises a base element on which at least one cutting edge is arranged. The base element ensures that the axial movement of the cutting device can be carried out safely. If the cutting device has precisely one cutting edge, only one slot is introduced into the metal seal ring after the tool has been actuated. As a result, after taking out the spark plug, the removal of the metal seal ring from the spark plug is somewhat difficult. Preferably, the cutting device therefore has two or three or four cutting edges. Accordingly, the metal seal ring is then divided into two, three or four parts. As a result, removal of the divided metal seal ring from the spark plug is easily possible, or the metal seal ring automatically falls off the spark plug after the dividing process.

In order to ensure uniform application of force of the cutting device to the metal seal ring, the base element comprises a ring on which the cutting edges are arranged. The cutting edges are preferably arranged on the outer circumference of the ring.

Furthermore preferably, according to an example embodiment of the present invention, the cutting edges of the cutting device are arranged exchangeably. As a result, after a certain period of use, the cutting edges can be exchanged if they have become dull due to use.

According to a further, preferred embodiment of the present invention, the actuation device comprises a first guide element articulated to the lever, and a cylinder with a tapering end. The tapering end of the cylinder is in contact with the first guide element. Furthermore, the cylinder element is operatively connected to the cutting device. Thus, by actuating the lever, the first guide element is moved axially and transmits the movement via the cylinder to the cutting device. By forming the cylinder with a tapering end, even if there is some play of the individual parts of the actuation device, safe axial movability of the cutting device is given.

Particularly preferably, according to an example embodiment of the present invention, the actuation device furthermore comprises a second guide element which is arranged between the cylinder and the cutting device. Particularly preferably, a connection element is provided, which is arranged on the second guide element and is operatively connected to the base element of the cutting device.

Particularly preferably, according to an example embodiment of the present invention, the tool furthermore comprises a restoring element, which automatically returns the actuation device and the cutting device to the initial state. Preferably, the restoring element is in this case integrated into the actuation device, in particular between the cylinder and the second guide element. The restoring element is preferably a spring, in particular a cylindrical spring, wherein the second guide element furthermore preferably has a spring receptacle.

Furthermore preferably, according to an example embodiment of the present invention, in the axial direction, the housing comprises a protrusion opening from which an inserted spark plug partially protrudes into the surroundings. As a result, an axial length of the tool can in particular be reduced and spark plugs of different axial lengths can in particular be processed with the same tool without any problems, in order to remove the respective metal seal rings on the spark plugs.

According to an example embodiment of the present invention, the receiving area of the tool can in this case be designed to be relatively large, since it is not necessary for the spark plug itself to be supported on one side on the receiving area, but it is sufficient for the removal of the metal seal ring if the metal seal ring is supported on the support device. Preferably, the receiving area has a shoulder, so that the receiving area substantially corresponds to an outer contour of the spark plug.

For space-saving storage, the housing preferably has a recess for receiving the lever on an outer side. In this case, a holding Substitute Specification device for the lever can also be provided, so that the lever remains positioned in the recess on the outer side of the housing. The holding device can, for example, be an undercut or a latching of the lever into a correspondingly formed holding device.

The tool according to the present invention can be used for all types of spark plugs, in particular hook spark plugs and prechamber spark plugs. The housing of the tool is preferably produced from a metal material.

BRIEF DESCRIPTION OF THE DRAWINGS

A preferred exemplary embodiment of the present invention is described in detail below with reference to the figures.

DETAILED DESCRIPTION OF EXAMPLE EMBODIMENTS

A tool 1 according to a preferred exemplary embodiment of the present invention is described in detail below with reference to FIGS. 1 to 4.

Figure 1:
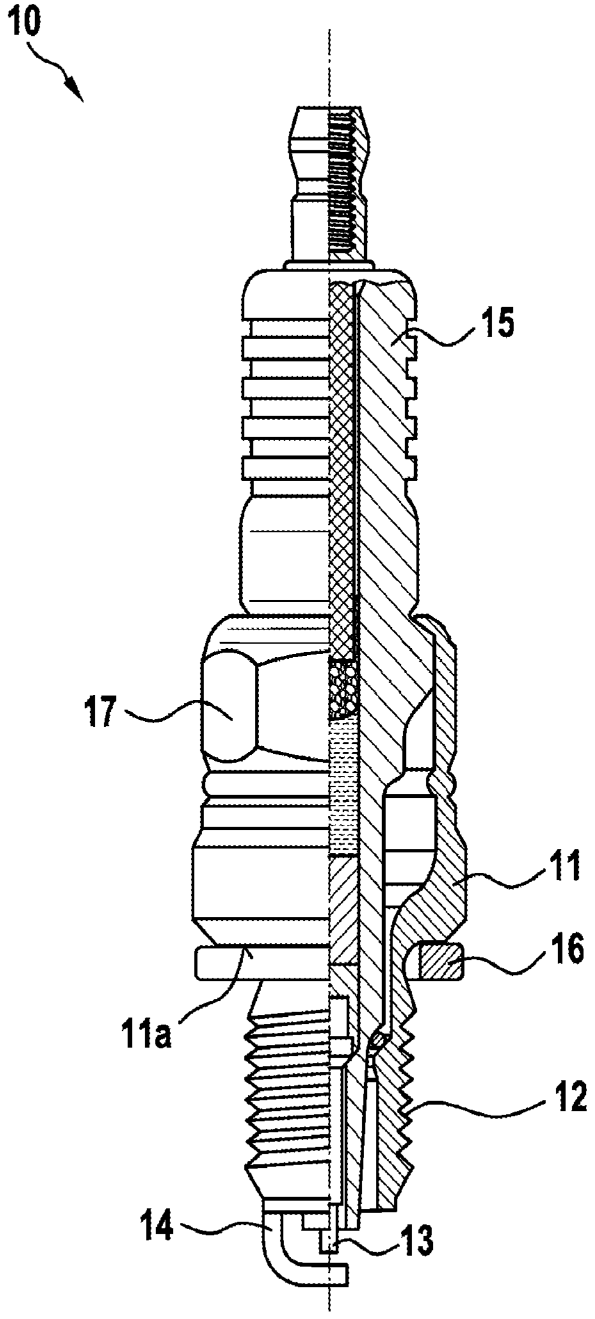
FIG. 1 is a schematic, only partially sectional view of a hook spark plug with a metal seal ring to be removed.

The tool 1 is able to safely remove the metal seal ring 16 arranged on a spark plug in FIG. 1. In this case, the metal seal ring 16 can also be plastically deformed and can be very firmly connected to the spark plug.

Figure 2:
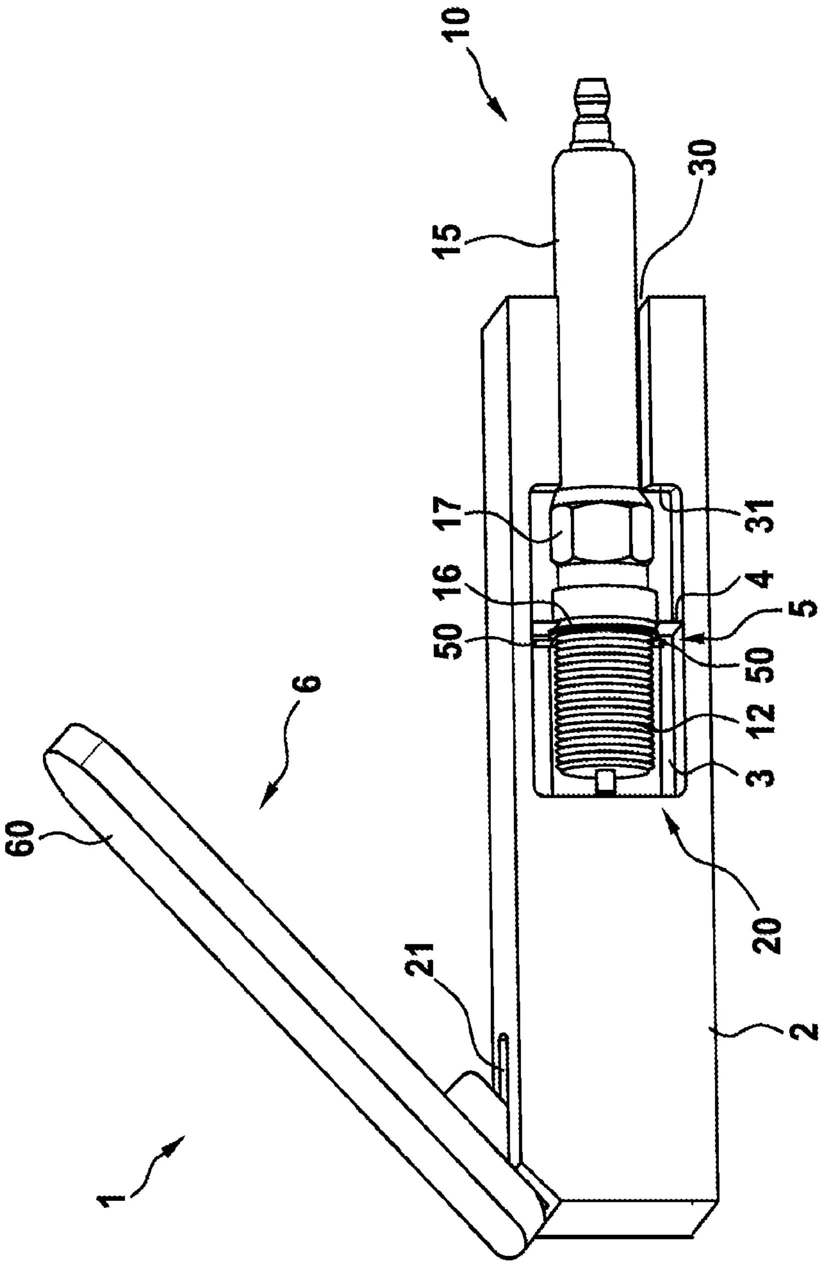
FIG. 2 is a schematic, perspective view of a tool according to an example embodiment of the present invention with a spark plug inserted into the tool.
Figure 3:
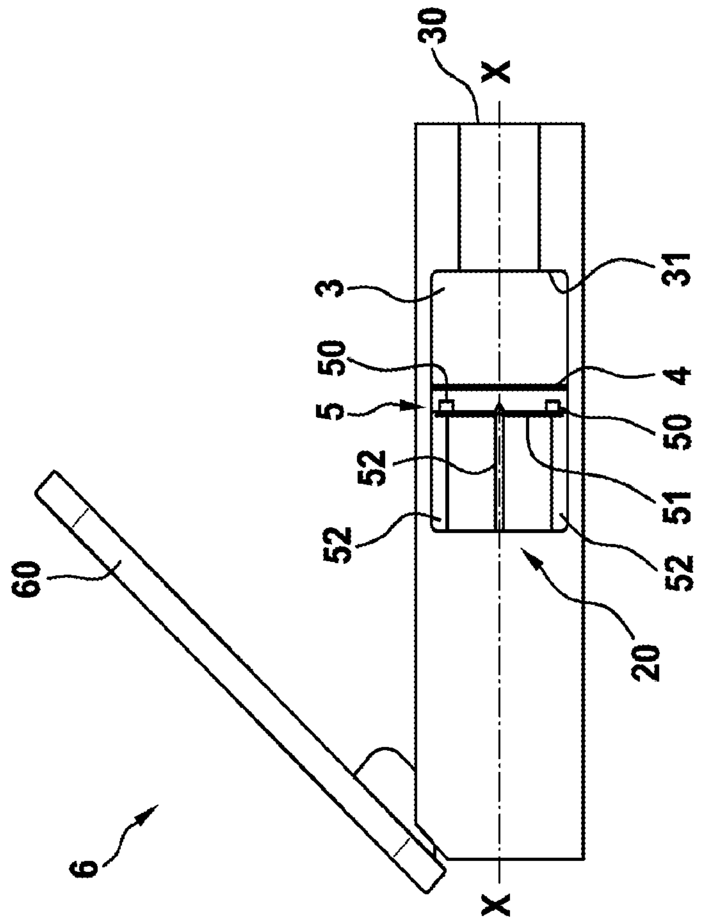
FIG. 3 is a schematic side view of the tool of FIG. 2.

FIGS. 2 and 3 show a general view of the tool 1. The tool 1 comprises a housing 2 made of a metal material with a receiving area 3 for the spark plug. FIG. 2 shows the inserted state of the spark plug 10 in the receiving area 3. The housing 2 has an open longitudinal side on which the receiving area 3 is exposed and configured such that the spark plug 10 can be inserted into the receiving area 3.

In an axial direction X-X, the housing 2 has a protrusion opening 30 from which, as shown in FIG. 2, the spark plug 10 partially protrudes from the tool 1. This protrusion opening 30 makes it possible for the tool to be suitable for spark plugs of a wide variety of geometric dimensions. The receiving area 3 furthermore comprises a shoulder 31, so that the receiving area substantially corresponds to an outer contour of the spark plug.

The tool 1 furthermore comprises a support device 4 which projects into the receiving area 3. The support device 4 can also be seen in detail in FIG. 4. The support device 4 is in this case a ring-shaped disk which projects into the receiving area 3 and is firmly connected to the housing 2, for example via a welded connection. Alternatively, the support device is formed integrally with the housing 2.

The support device 4 is configured such that the metal seal ring 16 to be removed rests against the support device 4 on one side when the spark plug is inserted.

The tool 1 furthermore comprises a cutting device 5 which can be moved in the receiving area 3 in the axial direction X-X of the tool. The cutting device 5 is arranged in the initial position, shown in FIG. 4, in such a way that a gap 8 is formed between the cutting device 5 and the support device 4. The metal seal ring 16 is positioned in this gap 8 when the spark plug has been inserted. This is indicated in FIG. 4 by the metal seal ring 16 drawn in dashed lines.

Furthermore, the tool 1 comprises an actuation device 6 which can be actuated by hand. The actuation device 6 is operatively connected to the cutting device 5 in such a way that an axial movement of the cutting device 5 can be carried out in the receiving area 3. In the process, the cutting device 5 is moved into the gap 8, in order to axially divide the metal seal ring 16. This is indicated in FIG. 4 by the arrow A.

Figure 4:
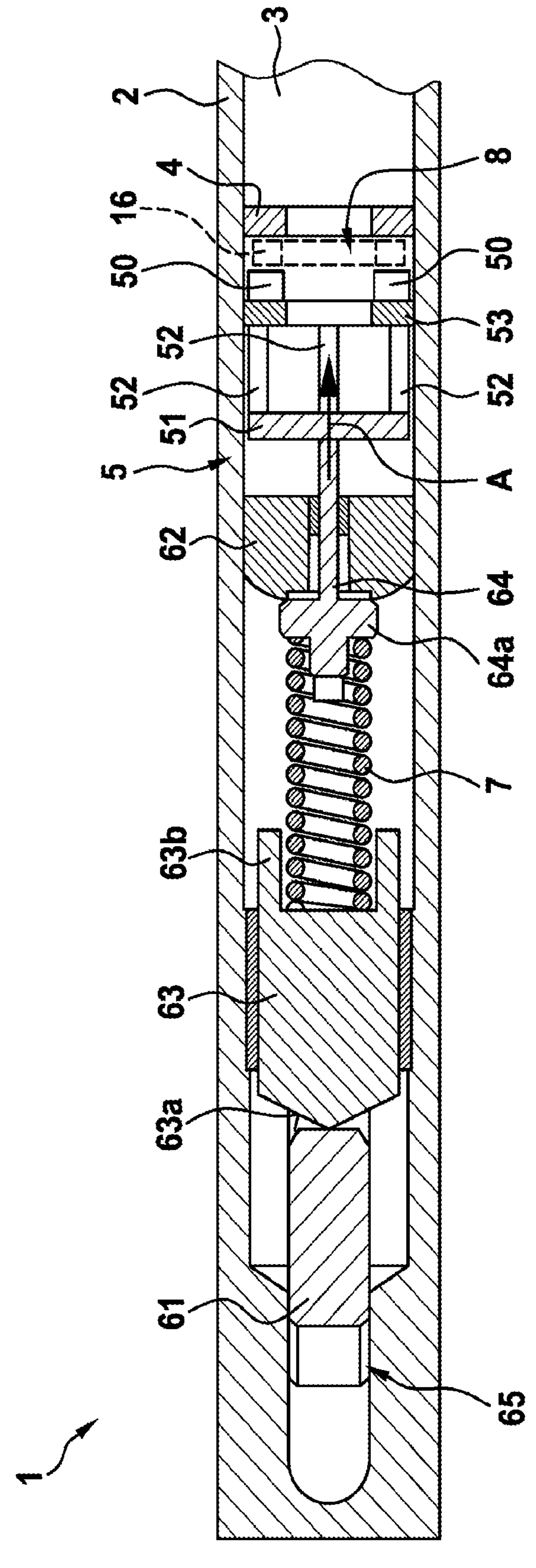
FIG. 4 is a schematic partial sectional view of the tool of FIG. 2.

As can be seen from FIGS. 3 and 4, the actuation device 6 comprises a lever 60 which can be actuated by hand and which is articulated to the housing 2 of the tool. The articulated joint 65 is shown schematically in FIG. 4. The actuation device 6 furthermore comprises a first guide element 61, which is guided in the receiving area 3 in an axially movable manner. Furthermore, the actuation device 6 comprises a cylinder 63 with a tapering end 63*a*. The tapering end 63*a* is in contact with the first guide element 61. The other end of the cylinder 63 is formed with a flange 63*b* which serves to receive an end of a restoring element 7. The actuation device 6 furthermore comprises a second guide element 62 through which a bar 64 extends. A spring holder 64*a* is arranged on the bar 64 and is in contact with the other end of the restoring element 7. The bar 64 is firmly connected to a cutting edge plate 51 of the cutting device 5, for example by means of a welded connection, in order to transmit the axial movement to the cutting device 5. Four rods 52, on the end of which a ring 53 is fastened, on which two cutting edges 50 are arranged, are arranged on the cutting edge plate 51. The cutting edges 50 are arranged at mutually opposite positions on an outer circumference of the ring 53. A width of the cutting edges 50 is equal to or greater than a width of the metal seal ring 16, in order to ensure that the latter is fully divided.

The restoring element 7, which is a cylindrical spring in this exemplary embodiment, is thus part of the actuation device 6. The actuating force, which is exerted via the lever 60, is thus transmitted via the first guide element 61, the cylinder 63, the restoring element 7, the bar 64, the cutting edge plate 51, the rods 52 and the ring 53. As a result, the cutting device 5 is pressed in the direction of the arrow A against the metal seal ring 16, which is supported on the support device 4, and divides under the action of an appropriate force.

In order to ensure restoration, the restoring element 7 is firmly connected to the cylinder 63 on the one hand and to the bar 64 on the other hand.

Thus, by means of the tool 1 according to the present invention, a metal seal ring 16 can be safely separated from a spark plug 10 by cutting. In this exemplary embodiment, the cutting device 5 has two cutting edges 50. However, it should be noted that it is also possible to use only one cutting edge or, particularly preferably, to use three or four cutting edges, in order to divide the metal seal ring 16 into a plurality of pieces.

In order to enable safe insertion of the spark plug 10 into the receiving area 3, the receiving area 3 has approximately the shape of an outer contour of the spark plug. By means of the support device 4, which is designed to be substantially U-shaped, in order to enable lateral insertion of the spark plug into the tool, the spark plug with a metal seal ring 16 can be safely inserted into the tool in such a way that the metal seal ring 16 is positioned in the gap 8 between the cutting device 5 and the support device 4. The gap 8 is selected such that metal seal rings of different thicknesses can be inserted. By providing the protrusion opening 30, spark plugs of different lengths on the one hand and spark plugs with metal seal rings of different thicknesses on the other hand can thus be safely processed.

The invention claimed is:

1. A tool for removing a metal seal ring from a spark plug, comprising:

a housing with a receiving area for the spark plug, wherein the housing has an open longitudinal side on which the receiving area is exposed and is configured for inserting the spark plug via the open longitudinal side into the receiving area;

a support which projects into the receiving area and against which-the metal seal ring of the spark plug, when the spark plug is inserted into the receiving area, rests in an axial direction;

a cutter which can be moved in the receiving area in the axial direction of the tool, wherein a gap for receiving the metal seal ring of the spark plug is formed between the cutter and the support; and an actuator, which can be actuated by hand and is operatively connected to the cutter, to carry out an axial movement of the cutter in the receiving area, and to move the cutter in the axial direction into the gap to cut the metal seal ring using the cutter.

2. The tool according to claim 1, wherein the actuator includes a lever which is operatively connected to the cutter, wherein the cutter can be moved in the axial direction when the lever is actuated.

3. The tool according to claim 1, wherein the cutter has a base element on which at least one cutting edge is arranged.

4. The tool according to claim 3, wherein the cutter has two or three or four or more cutting edges.

5. The tool according to claim 3, wherein the base element includes a ring.

6. The tool according to claim 2, wherein the actuator includes a first guide element articulated to the lever, and a cylinder with a tapering end, wherein the tapering end is in contact with the first guide element, and wherein the cylinder is operatively connected to the cutter, to carry out the axial movement of the cutter.

7. The tool according to claim 6, wherein the actuator further includes a second guide element which is arranged between the cylinder and the cutter.

8. The tool according to claim 1, further comprising a restorer to return the actuator and the cutter to an initial state.

9. The tool according to claim 1, wherein, in the axial direction, the housing has a protrusion opening from which a portion of an inserted spark plug can protrude.

10. The tool according to claim 2, wherein, on an outer side, the housing has a recess for receiving the lever, and/or wherein the receiving area has a shoulder, so that the receiving area substantially corresponds to an outer contour of the spark plug.

11. The tool according to claim 8, further comprising a bar connected to the cutter, the actuator being operatively connected to the cutter via the restorer and the bar.

* * * * *